United States Patent

[11] 3,583,449

| [72] | Inventor | Elbridge W. Thrasher<br>Ukiah, Calif. |
|---|---|---|
| [21] | Appl. No. | 766,118 |
| [22] | Filed | Oct. 9, 1968 |
| [45] | Patented | June 8, 1971 |
| [73] | Assignee | Masonite Corporation |

[54] SELF-GUIDING SAW BLADE
2 Claims, 5 Drawing Figs.

[52] U.S. Cl. ..................................................... 143/133R,
143/40, 143/140R
[51] Int. Cl. ...................................................... B27b 33/08
[50] Field of Search........................................... 143/133,
133-1, 134, 140, 140-1, 140-2, 140-3, 137, 141,
143, 40, 37, 160, 167

[56] References Cited
UNITED STATES PATENTS

| 102,286 | 1870 | Littlepage .................... | 143/140 |
| 1,402,427 | 1922 | McKenney ................... | 143/133 |
| 2,507,644 | 1950 | Peters.......................... | 143/37X |
| 3,129,735 | 1964 | Sweet........................... | 143/140X |
| 3,275,045 | 1966 | Beeley.......................... | 143/37 |
| 2,795,247 | 1957 | Topolinski.................... | 143/133 |

*Primary Examiner*—Andrew R. Juhasz
*Assistant Examiner*—James F. Coan
*Attorney*—Eckhoff and Hoppe

ABSTRACT: A self-guiding circular saw blade for use in making a following cut, said blade being formed with a plurality of non cutting appendages that project laterally from the saw blade in the region of its gullet line, each appendage being resilient and projecting laterally a distance substantially equal to but preferably greater than the kerf line of said blade.

In a saw machine for cutting lumber, a pair of circular saw blades mounted on opposite sides of a cutting plane, one blade having a cutting depth overlapped relative to the cutting depth of the other for making a following cut in the precut of the other, said one blade being formed with a plurality of guiding appendages that project laterally from the saw blade in the region of its gullet line, each appendage being resilient and projecting laterally a distance substantially equal to but preferably greater than the kerf line of said one blade.

INVENTOR.
ELBRIDGE W. THRASHER

PATENTED JUN 8 1971 3,583,449
SHEET 2 OF 2
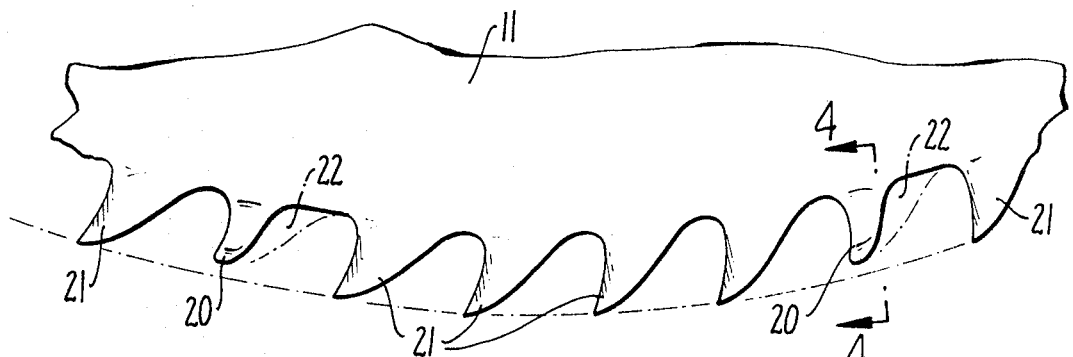
FIG. 2.
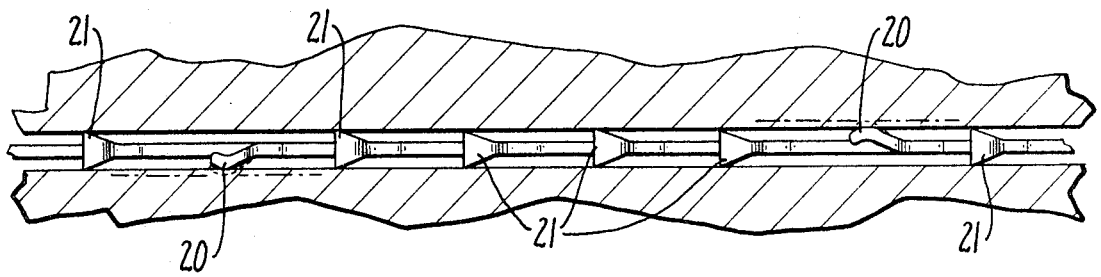
FIG. 3.
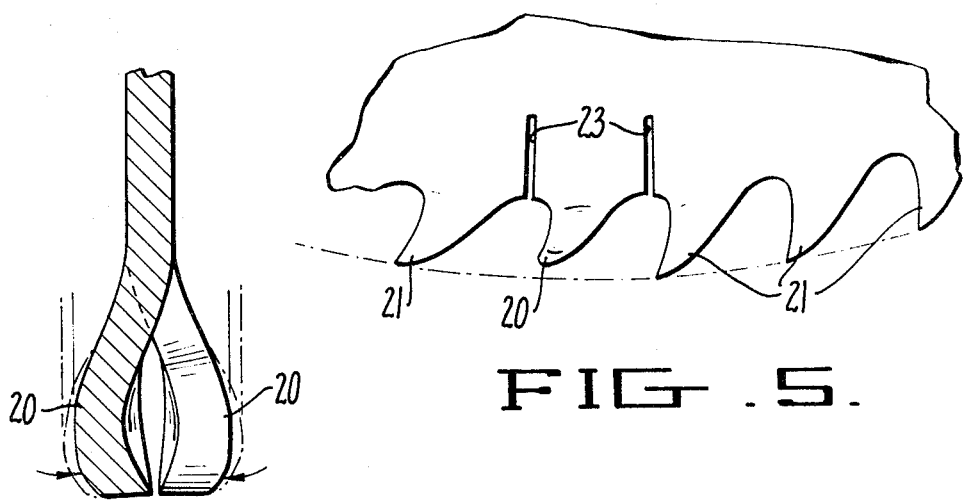
FIG. 4.
FIG. 5.
INVENTOR.
ELBRIDGE W. THRASHER
BY Eckhoff and Hoppe
ATTORNEYS

SELF-GUIDING SAW BLADE

This invention relates to saw blades and saw machinery particularly of the type where two saw blades are used in sequence for making one complete cut, the first making a partial cut and the second finishing the cut started by the first. In general, this operation is commonly performed by a double arbor saw machine.

One common difficulty in making a single cut with two saw blades is that the second blade must be maintained in alignment with the first. A failure to maintain alignment will produce flaws or defects which, under the poorest conditions, appear as cuts in two different planes. Under more favorable conditions, the flaws will appear as a warped surface or as an abrasion.

The alignment of two saw blades is fairly well maintained by machine setups which fix the saws to each of their supporting arbors. Furthermore, it is recognized that under favorable conditions the following cut of the second saw is guided somewhat by the precut groove made by the first saw blade. But even then, contacts with foreign objects in the material undergoing cutting may dull the blade and cause it to run out of alignment. The problems of maintaining two saws in alignment are also present when the saws are not fixed to their arbors but are free to move axially thereon. Such problems are particularly encountered when relatively thin saws are used even when guided in predetermined cutting planes as by saw guides that make lateral contact with the saws in a region of their gullet lines. Apparatus of this type is the subject of applicant's U.S. Pat. No. 3,285,302, an important feature of such apparatus being that the saw blades are free to move axially on their arbors during cutting. Under those conditions, it might seem impossible to maintain an alignment between two saw blades, one making a precut and the second a following cut. It has been found, however, that such is not only possible but that the two cuts can be made with such great precision that the cut surfaces of the work material appear as though they have been severed with a single saw.

In brief the present invention involves the use of a self-aligning saw blade that will track itself in the precut formed by a conventional saw blade. More particularly, this self-guiding blade is formed with a plurality of noncutting appendages that project laterally from the saw blade in the region of the saw blade's gullet line, each appendage being resilient and projecting a lateral distance substantially equal to but preferably greater than the kerf line of the blade. The appendages may be made from teeth of a conventional saw blade by simply bending them outward from the saw, then removing their lateral cutting edges and preferably reducing their radial height. It will be seen, of course, that the appendages make contact laterally with the work but are flexed into the kerf plane of the saw without cutting.

It is therefore a principal object of this invention to provide a self-guiding saw blade which when used in following sequence with a conventional blade will track in the precut of the first.

Another object of this invention is to provide a self-guiding circular saw blade of the type described that may be used in a double arbor type of machine with saw guides that engage the leading edge of each blade for guiding the saws in a common plane.

Other objects of this invention will become apparent in view of the following detailed description and the accompanying drawings.

In the drawings forming a part of this application and in which like parts are identified by like reference numerals throughout the same, FIG. 1 is a schematic section of a double arbor saw machine having a pair of complementary saw blades and saw guides, said saw blades being constructed and operated in the preferred manner contemplated by this invention;

FIG. 2 is an enlarged detail of a portion of the uppermost saw blade shown in FIG. 1;

FIG. 3 is an enlarged section taken on lines 3-3 of FIG. 1;

FIG. 4 is an enlarged section taken on lines 4-4 of FIG. 2; and

FIG. 5 is an elevation of a portion of a saw blade constructed in a modified manner contemplated by this invention.

Figure 1:
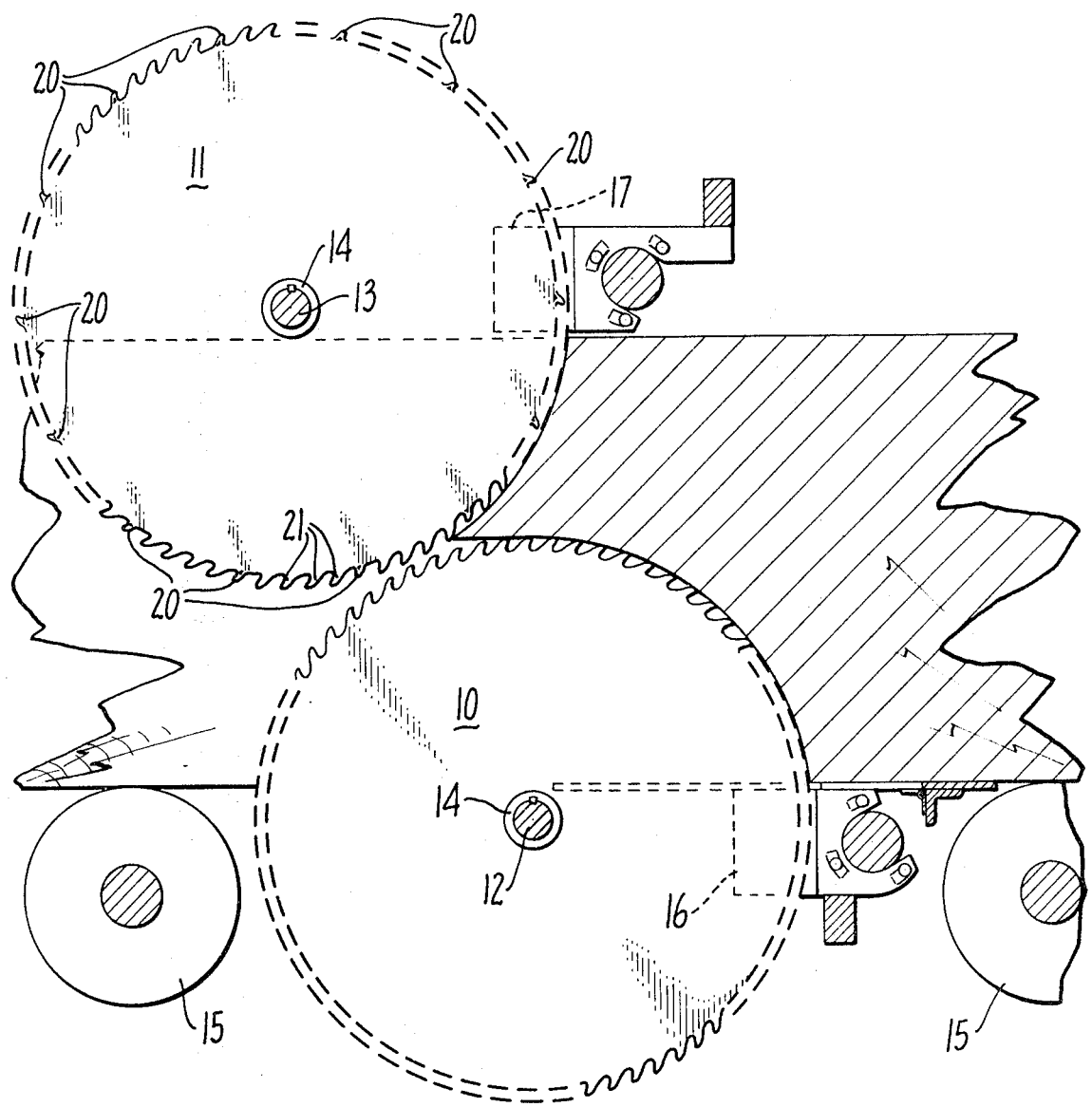

Referring to FIG. 1, there is shown a double arbor machine comprised of complementary saw blades 10 and 11, each blade being mounted upon and keyed to a pair of arbors 12 and 13, respectively, by saw collars 14. A plurality of rollers 15 are provided for moving cants or flitches into and through blades 10 and 11. Each saw blade is mounted by its collar 14 so that it may be moved axially upon its supporting arbor. But the lateral position of each saw is controlled by pairs of saw guides 16 and 17 which define a common plane of rotation and operate conjunctively to guide the leading edges of blades 10 and 11 in a common cutting plane. It is to be understood that the arrangement of saw blades and saw guides shown is essentially the same as that taught in U.S. Letters Pat. No. 3,285,302, the saw guides on the near side of the blades having been omitted from the drawing.

The present invention more particularly relates to the construction of saw blade 11 which, it has been found, provides an unusual degree of alignment in the cuts made by the saw blades. As a consequence, lumber of relatively great thickness can be moved between a pair of saw blades and completely severed, the resulting cut having the appearance as though it were cut by a single saw. Such results allow relatively small diameter saws to be used in making cuts which heretofore could only have been made by a single saw of almost twice that diameter.

To this end, and for other purposes, saw blade 11 is formed with a symmetrical pattern of guiding appendages 20 which project laterally from the saw in the region of its gullet line. Appendages 20 may be formed from teeth 21 of a conventional saw. Such teeth are bent laterally from the plane of the saw and rounded off top and sides. Thus formed, each modified tooth or appendage projects laterally from one side or the other of the saw blade a distance substantially equal to but preferably greater than the width of the saw's kerf line, as shown in FIGS. 3 and 4. The natural resiliency of steel (from which conventional saws are made) allows the appendages to be moved back in the plane of the saw kerf as they contact the precut groove formed by saw 10.

An exemplary type of saw blade 11 has been made from a conventional saw having a diameter of 22 inches and 70 teeth. Every fifth tooth of the saw was modified to form a guide appendage 20. Moreover, every other appendage-forming tooth was bent laterally out on the same side of the blade and opposite to the side from which the closest appendages project. This produced a staggered arrangement of appendages which project first from one side of the blade and then from the other as examined by viewing successive appendages around the blade's periphery. Using such an arrangement of appendages with an overlap of cutting of approximately 2 inches, it will be found that two appendages are disposed in the overlapped area of cutting at all times, each appendage applying a bias that tends to move the bottom of blade 11 in opposite directions. In operation, the bias of the two appendages nullify each other and maintain the blade in a centered position relative to the precut of blade 10.

It has been found essential that the appendages project out laterally a distance substantially equal to but preferably greater than the saw kerf to insure proper guiding. This is especially true when saw blades 10 and 11 are operated in battery with other blades that are similarly aligned. Under such conditions, the bias imposed by each appendage of one blade 11 cooperates with the bias of appendages provided on other saws 11 to maintain precision alignment between each of the saws on the arbor.

It is apparent that each appendage must have sufficient flexibility so that it will be moved into the cutting plane of the saw teeth without causing excessive binding in the precut formed by blade 10. Referring to FIG. 2, flexibility of appendages 20 is greatly improved by removing a base portion of each appendage-forming tooth, a removed base portion being indicated in FIG. 2 by broken lines and referenced by the number 22. The reduction in the base dimension of the appendage will, obviously, increase flexibility.

The flexibility of appendages 20 may also be increased by forming radial slots as shown in FIG. 5. This modification in structure provides radial slots 23 on both sides of the appendage-forming teeth. Although these slots also allow the appendages to be more easily deflected into the plane of the cutting teeth, it will be evident that the slots necessarily pass between the wear guide surfaces of saw guide 17 as the blade is rotated. Unless care is taken to relieve the edges of each slot, the wear guide surfaces may be abraded, thereby increasing the wear and shortening the life of the saw guides.

Although preferred embodiments of this invention have been illustrated and described, various modifications and changes may be resorted to without departing from the spirit of the invention or the scope of the attached claims. For example, it is contemplated that guide appendages may be made by building up the lateral surfaces of saw teeth with coatings of sintered carbide. This would obviate the need for bending the teeth out from the saw kerf while providing a hardened contact that resists wear. It is also possible to increase the resiliency of the appendage-forming teeth by thinning the sides of the teeth in lieu of or in addition to removing a portion of the base. Further, it is to be understood that this invention may be used on various types of planar blades such as carbide or stellite tipped saws.

What I claim is:

1. A self-guiding circular saw blade for use in making a following cut, said blade being formed with a plurality of essentially noncutting appendages that project laterally from the saw blade in the region of its gullet line, each appendage being resilient and projecting laterally a distance substantially equal to but preferably greater than the kerf of said blade, the appendages of said blade being formed from conventional saw teeth that have been bent laterally, the lateral cutting edges being removed, each appendage-forming tooth having a portion of its base removed to increase flexibility.

2. A self-guiding circular saw blade for use in making a following cut, said blade being formed with a plurality of essentially noncutting appendages that project laterally from the saw blade in the region of its gullet line, each appendage being resilient and projecting laterally a distance substantially equal to but preferably greater than the kerf of said blade, the appendages of said blade being formed from conventional saw teeth which have been built up laterally with hardened deposits, the lateral cutting edges being removed.